June 4, 1935.  L. C. RYAN  2,004,081
METHOD OF AND MEANS FOR REPAIRING RAIL JOINTS
Filed Sept. 15, 1932  2 Sheets-Sheet 1
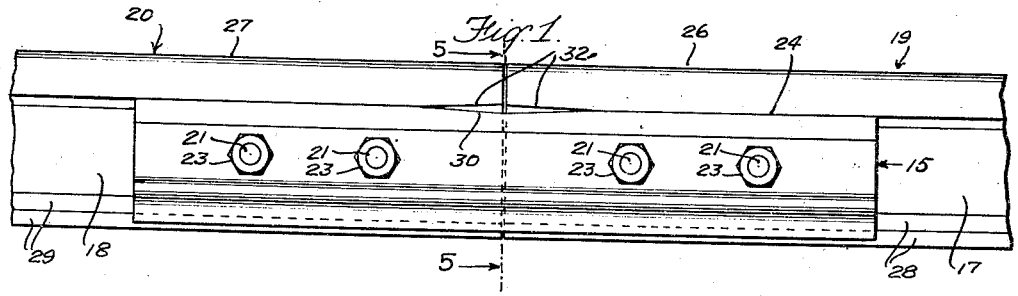
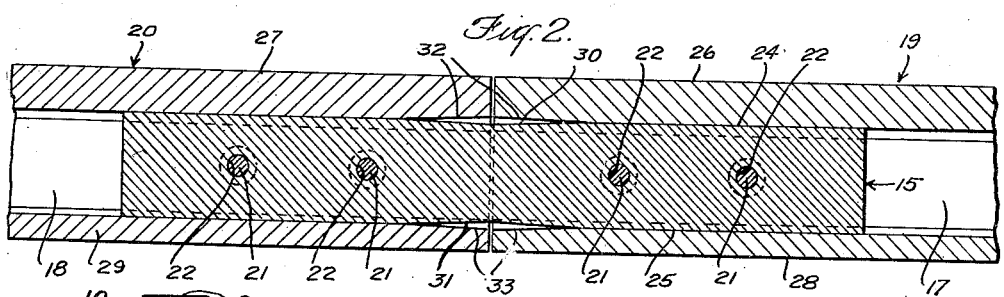
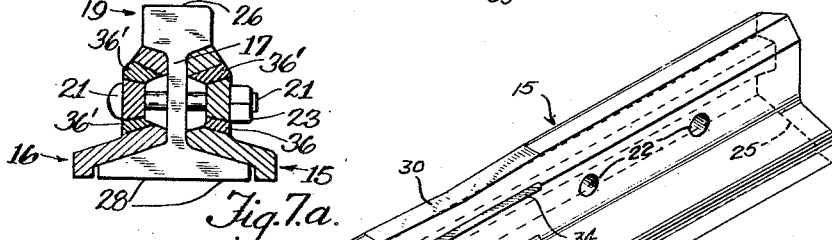
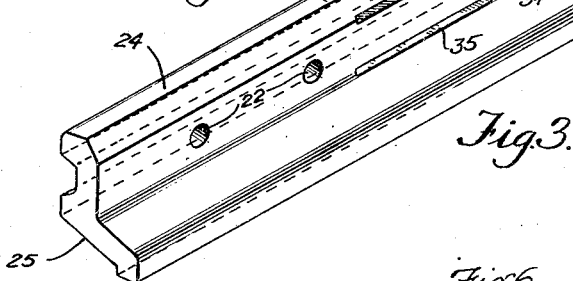
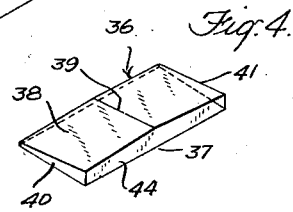
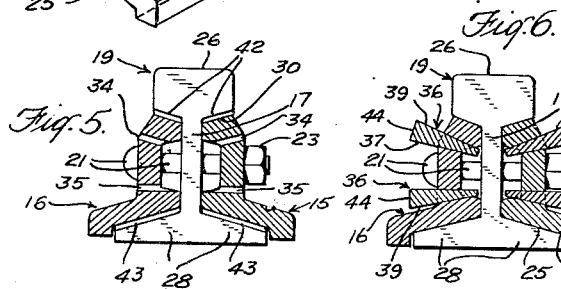
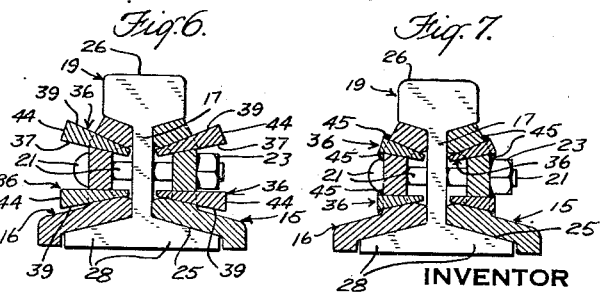
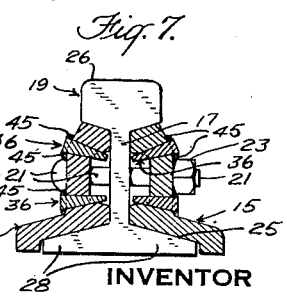
INVENTOR
LEO CHARLES RYAN
BY
ATTORNEY June 4, 1935.　　　　　L. C. RYAN　　　　　2,004,081
METHOD OF AND MEANS FOR REPAIRING RAIL JOINTS
Filed Sept. 15, 1932　　　2 Sheets-Sheet 2
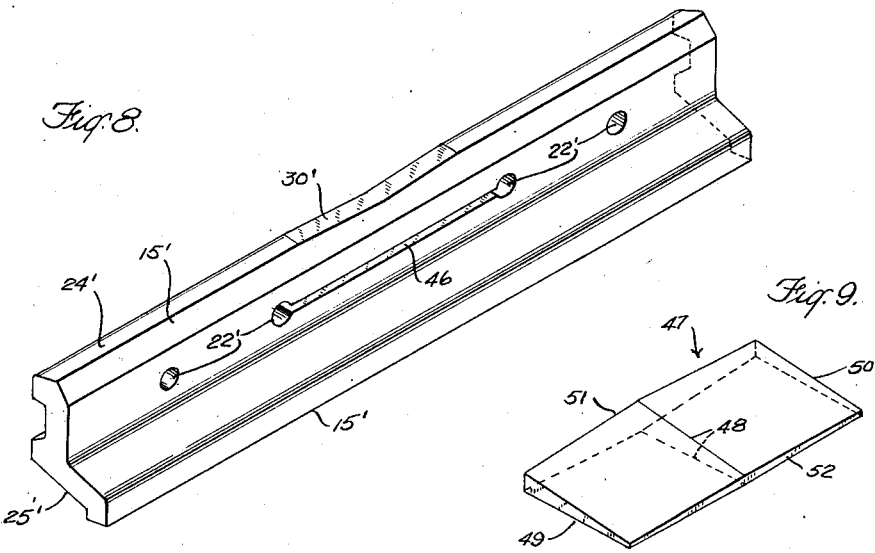
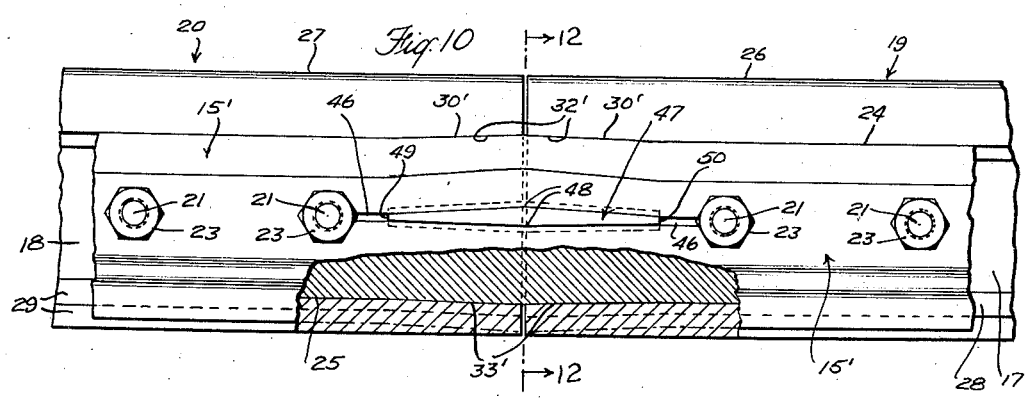
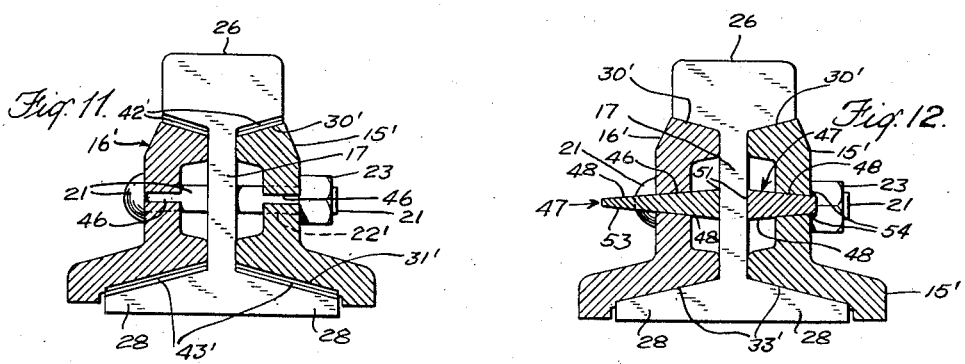
INVENTOR
LEO CHARLES RYAN
BY　E. R. Greenewald
ATTORNEY Patented June 4, 1935

2,004,081

UNITED STATES PATENT OFFICE 2,004,081

METHOD OF AND MEANS FOR REPAIRING RAIL JOINTS

Leo C. Ryan, Chicago, Ill., assignor to The Oxweld Railroad Service Company, a corporation of Delaware Application September 15, 1932, Serial No. 633,241

22 Claims. (Cl. 29—169)

This invention relates to the art of repairing or reconditioning worn rail joints, and particularly to a method of and means for reforming worn joint bars to accurately fit the opposed ends of battered or worn rails.

The usual rail joint comprises a pair of joint bars arranged at the ends of two adjacent or aligned rails, the bars being disposed on opposite sides of the rails and bolted together through openings in the webs of the rails and the bars. When the joint bars are new, the upper fishing or bearing surfaces of the bars contact the bottom surfaces of the rail heads, and the lower fishing surfaces thereof contact the top surfaces of the rail flanges, so that the bars fit accurately between the heads and flanges of the rails.

After the joints have been in use for a short time they become slightly loose, due to wearing of the fishing surfaces of the bars at the points contacting the ends of the rails. As the traffic passes over the rails, the pounding of the wheels then causes a battering or wearing at the ends of the rails, which increases the wearing of the bars at their fishing surfaces opposite the rail ends. As a result, the joints become loose with the fishing surfaces of bars having depressed center portions opposite the worn ends of the rails. Where the traffic moves in both directions over the tracks, the depressed areas of the fishing surfaces of the bars are of approximately concave form, with the greatest depth of wear opposite the ends of the rails. In one way tracks, where the traffic moves in one direction only, the depressed areas are of irregular shape, the bearing surfaces of the "receiving" rail and portions of the joint bars adjacent thereto being worn to a much greater extent than the bearing surfaces at the "leaving" rail. It then becomes necessary to repair the rail joints to again obtain a tight fit between the bars and the heads and flanges of the rails.

In repairing rail joints it has been the practice heretofore to build sufficient material at the depressed areas of the fishing surfaces of the bars, as by welding, for example, so as to form crowned bearing surfaces in the bars to compensate for their wear as well as for the wear of the rail fishing surfaces adjacent thereto. It also has been the practice to obtain this crowned or convex bearing surface in the bars by compression applied mechanically at their depressed worn portions. In each of the above methods, the worn joint bars are removed from the joints, and, after being crowned, are again secured in place against the ends of adjacent rails.

Both of these methods of reforming joint bars are not entirely satisfactory, as it has not been possible to obtain an accurate fit of the bars between the heads and flanges of rails at all times, because the bars may require a different degree and shape of crowning where the amount and kind of wear at the bearing surfaces of the bars and rails is not the same at each joint. This is so because the bearing surfaces of the bars and rails do not wear at the same rate for all rail joints, and this is particularly true where an entire section of track is not subjected to the same amount of traffic. Moreover, the bearing surfaces of the rails and joint bars are worn irregularly where the traffic is one way, or where the traffic in one direction in a two way track exceeds the traffic in the opposite direction. For these reasons, it has been impossible to obtain an accurate fit at each individual joint when the joint bars are removed from the rails, crowned at the depressed areas of the fishing surfaces, and then placed back into position at the joint.

I have found that the above difficulties can be overcome by reforming the joint bars while they are positioned at the rail joint. By this method, the depressed areas of the bearing surfaces of joint bars can be raised to compensate exactly for their own wear and the wear of the bearing surfaces of the rails adjacent thereto, so that each rail joint can be repaired to again give an accurate fit of the joint bars between the worn heads and flanges of adjacent rails.

The primary object of my invention, therefore, is to reform joint bars while positioned at the rail joints and thereby utilize the rails as a die structure to obtain the exact amount of crowning at the depressed worn areas of the bars.

Another object of my invention is to repair worn rail joints by reforming joint bars without removing them from the rail joints.

A further object of my invention is to provide rail joint bars having one or more longitudinal slots intermediate their ends.

A further object of my invention is to reform worn rail joint bars by spreading a longitudinal slot in the bars to produce a crowned area at the fishing surfaces thereof, and maintaining the slots in their widened condition.

A further object of my invention is to reform rail joint bars while positioned in a suitable die structure instead of utilizing the rails as a die structure, when it is desired to obtain a definite amount of crowning at the worn portions of the bars.

A further object of my invention is to provide a reformed rail joint bar having one or more wedges forced through a longitudinal slot in the bar in such a manner that the bar is expanded laterally to produce a crowned portion which compensates for its own wear as well as the wear in the rail bearing surfaces adapted to contact therewith.

Further objects and advantages of my invention will become apparent as the following description proceeds, and the various features of novelty which characterize my invention are pointed out with particularity in the claims annexed to and forming a part of this specification. In the drawings:

Fig. 1 is a side elevation of a worn rail joint with joint bars of angle bar form;

Fig. 2 is a sectional view of the rail joint shown in Fig. 1, taken longitudinally through an angle bar and heads and flanges of the adjacent rails, to show more clearly the worn bearing surfaces of the bars and rails;

Fig. 3 is a perspective view of the angle bar removed from the rail joint shown in Fig. 1, and after longitudinal slots have been cut in the bar opposite the worn bearing areas;

Fig. 4 is a perspective view of a wedge adapted to be forced in a slot of the angle bar shown in Fig. 3;

Fig. 5 is a sectional view on line 5—5 of Fig. 1, opposite the worn bearing surfaces of the angle bars and rails, with the slots cut in the angle bars;

Fig. 6 is a sectional view similar to Fig. 5 after wedges have been forced through the slots in the bars, showing the worn bearing surfaces of the bars contacting the worn bearing surfaces of the rails;

Fig. 7 is a sectional view similar to Fig. 6 showing the completed reformed rail joint;

Fig. 7a is a sectional view similar to Fig. 5, showing a completed reformed rail joint built-up with welding metal;

Fig. 8 is a perspective view of a worn angle bar with a single longitudinal slot cut opposite the worn areas of the bar between adjacent bolt holes;

Fig. 9 is a perspective view of a wedge adapted to be forced in the slot shown in Fig. 8;

Fig. 10 is a side elevation of a rail joint, partly in section, with the angle bar shown in Fig. 8 positioned in the joint and after the wedge shown in Fig. 9 has been forced in the slot to crown the depressed worn areas of the bar;

Fig. 11 is a sectional view on line 12—12 before wedges have been forced through the slots; and Fig. 12 is a sectional view similar to Fig. 11 after wedges have been forced through the slots, one half of the reformed rail joint being shown completed.

Referring to Figs. 1 to 7, inclusive, I have shown a typical rail joint comprising a pair of joint bars 15 and 16 of any well known type, such as angle bars, for example, arranged against the webs 17 and 18 of two adjacent rails 19 and 20, respectively. The bars 15 and 16 are disposed on opposite sides of the rails and secured together tightly by bolts 21 passing through aligned openings in the webs 17 and 18 and openings 22 in the bars 15 and 16, the bolts being threaded to receive nuts 23.

When the rail joint is new, the upper and lower fishing surfaces 24 and 25 of the bars 15 and 16 fit accurately, throughout their entire length, between the bottom surfaces of the rail heads 26 and 27 and the top surfaces of the rail flanges 28 and 29. As the traffic passes over the rail joint it becomes loosened, and the fishing surfaces of the bars commence to wear at the points opposite the rail ends. After the bars are slightly worn, the continual passing of traffic over the rails causes wearing of the rail bearing surfaces contacting the worn portions of the bars, and these worn portions form depressed areas so that the bars no longer fit accurately between the bearing surfaces formed by the heads and flanges of the rails.

When the traffic passes over the rails in both directions, the worn depressed areas of the joint bars are approximately of concave form, as indicated at 30 and 31 in Figs. 1, 2 and 3, and the ends of the rail bearing surfaces opposite the worn areas 30 and 31 are worn away, as indicated at 32 and 33, respectively. As explained before, when traffic only passes over the rails in one direction, the depressed worn areas of the bars are of irregular shape. It will thus be seen that the depressed worn areas of joint bars may be of different length and depth according to the amount of traffic passing over the different portions of a section of track, and that they may be of different shape depending on whether the traffic is one way, two way with approximately the same amount of traffic in both directions, or two way with the traffic in one direction exceeding the traffic in the opposite direction.

In accordance with my invention the bars 15 and 16 may be reformed while positioned at the rail joint against the rails 19 and 20, thereby utilizing the rail heads 26 and 27 and rail flanges 28 and 29 as cooperating die elements to exactly fit the worn joint bars at the rail joint to compensate for the wear at 30 and 31 in the fishing surfaces of the bars 15 and 16, and also for the wear at 32 and 33 in the rail bearing surfaces. I do this by cutting longitudinal slots 34 and 35 in the bars 15 and 16 below and near the depressed worn areas 30 and 31, and by forcing wedges 36 through the slots to spread the same, the slots and wedges being of such shape that the depressed worn areas 30 and 31 are raised to contact and conform exactly with the shape of the adjacent worn rail bearing surfaces.

In one embodiment of my invention that I have illustrated, the slots 34 and 35 are shown as comparatively long and narrow openings of uniform width throughout their length, and the single wedge 36 employed to spread each slot comprises a flat base 37 and a top surface 38 having its greatest height at any longitudinal section of the wedge at its center 39, and gradually decreasing in height throughout its width to the edges 40 and 41. The slots 34 and 35 may be cut with a cutting torch without removing the bars 15 and 16 from the joint, or the bars may be removed from the joint, the slots cut, and the bars secured in position again.

When the slots 34 and 35 are cut in the bars, the worn joint in section appears as shown in Fig. 5, with spaces 42 and 43 formed between the worn fishing surfaces of the bars and adjacent worn surfaces of the rail heads and flanges. The wedges 36 are then forced into the slots to expand the bars laterally and crown the worn portions of the bars 15 and 16 until they fit accurately between the heads and flanges of the rails, as shown in Fig. 6. Before forcing in the wedges 36 it may be desirable to heat the portions of the bars between the slots 34 and 35 and the worn fishing areas 30 and 31, so that the bars can be reformed in the minimum length of time and with the least amount of effort.

After the wedges are forced in the slots and the bars reformed to fit the joint, the outer projecting ends 44 of the wedges are cut away as by a cutting torch, for example, and the wedges welded to the bars, as indicated at 45, in Fig. 7, thereby maintaining the wedges in their driven position and providing a rigid rail joint. It may also be desirable to fill or build up slots of worn rail joint bars by welding metal instead of employing wedges. When the slots 34 and 35 of the rail joint bars 15 and 16 in the rail joint shown in section in Fig. 5 are built-up in this manner, the reconditioned rail joint will appear in section as shown in Fig. 7a, with the longitudinal slots 34 and 35 filled with welding metal 36'.

In reforming joint bars by filling slots therein with welding metal, the slots can be spread, while the bars are positioned at the rail joint, until the depressed worn areas of the joint bars contact the adjacent rail bearing surfaces and exactly compensate for their wear and the wear of the rail bearing surfaces. This can be accomplished in any suitable manner, as by tapered chisels. While the slots are maintained in their widened condition, the slots are filled with welding metal and, after a considerable portion of the slots have been filled, the tapered chisels are removed and the spaces they formerly occupied in the slots are then filled with welding metal.

In Figs. 8 to 12 inclusive, I have shown a modified method of reforming joint bars with the rails utilized as a die structure, the parts in these figures which are the same as shown in Figs. 1 to 7a inclusive being designated by the same reference numerals. In this modified method, I slot bars 15' and 16' longitudinally at 46 opposite the depressed worn areas 30' and 31' and between adjacent openings 22', the slots being of uniform width throughout their length. I then force a single wedge 47 through the slot to crown both the upper and lower depressed areas of the bars at the same time. As shown in Fig. 9, the wedge 47 employed when only a single slot is cut in the bars comprises similar top and bottom surfaces having the greatest height at any longitudinal section at its center 48, and gradually decreasing in height toward the ends 49 and 50 from the base 51 to the tip 52 of the wedge.

In this modified method, after the slot 46 has been cut in the bars 15' and 16', the wedges 47 are inserted in the slots from the inner sides of the bars. The bars 15' and 16' are then positioned against the webs 17 and 18 of the adjacent rails 19 and 20, with the base 51 of each wedge abutting the webs of the rails, and the nuts 23 are turned tightly on the bolts 21 to force the wedges through the slots. The shape of the wedges 47 is such that the upper and lower worn depressed areas 30' and 31' are raised to occupy the spaces 42' and 43' formed between the bars 15' and 16' and the heads and flanges of the rails, as shown in Fig. 11; and the contours of the bearing surfaces 24 and 25 are changed so that they will contact and conform exactly with the worn rail surfaces 32' and 33', as shown in Fig. 10. In this manner the bars are expanded laterally to restore contact between the worn areas of the bars and rails. The outer projecting ends 53 of the wedges 47 are cut away, and the wedges then welded to the bars at 54 in the same manner as previously described when two slots are cut in each joint bar.

Where it is desired to employ small wedges in combination with welding metal to reform rail joint bars, utilizing the rails as a die structure, a small wedge of proper shape and size may be forced into a slot until a depressed worn area of the bar contacts the adjacent worn bearing surfaces of the rails. After the outer projecting end of the wedge is cut away, as described before, the portion of the slot not occupied by the wedge may be built up with welding material to provide a rigid rail joint.

While I have shown and described the reforming of rail joint bars whereby the contour of both their upper and lower fishing surfaces is changed, it may be desirable in some instances only to change the contour of one fishing surface. This is particularly true where it is only desired to back up the rail heads of joints, and in such cases only a single slot is cut below and near the depressed worn area in the upper fishing surface of a bar. The slot is then spread and maintained in its widened condition in any suitable manner as previously described.

Although I have shown bars having slots of uniform width and cooperating wedges of varying width for crowning the worn fishing areas, I do not wish to be limited to the particular shapes of slots and wedges illustrated, as other arrangements will occur to those skilled in the art. Thus, the slots may be of varying width and the cooperating wedges of uniform width so that, when the wedges are forced into the slots, the narrowest portion of the slots will be raised the greatest distance. In some cases it also may be preferable to employ more than one wedge in a single slot, especially where the worn fishing area is of irregular shape and varies considerably in depth of wear.

Where solid rail joint bars are employed and become worn, due to wear, the slots may be cut in the bars without removing them from the joints, or the bars may be removed, the slots cut in the bars, and the bars then secured in position at the joint. By utilizing the rails as a die structure for reforming worn joint bars, an efficient method is provided which eliminates considerable labor in carrying a supply of either new bars or bars reformed at a central point. Not only is the carrying of bars avoided, but each bar is reformed so that, regardless of the amount of wear and how irregular the worn fishing surfaces of the bar and rails may be, the proper shape of the reformed bar is obtained.

Instead of employing solid rail joint bars and slotting them longitudinally when they are worn, it may be desirable to employ joint bars which are slotted longitudinally intermediate their ends when they are new. In order to provide a rigid rail joint when new slotted bars are used, metal blocks may be inserted into the slots and secured to the bars in any suitable manner such, for example, as by spot welding. In repairing such rail joints when they become worn, the metal block may be removed and a wedge of appropriate shape forced into the slot to obtain the proper crowning at the worn fishing area in the bar.

It will thus be seen that a method of and means for repairing worn rail joints has been provided whereby worn joint bars may be reformed to exactly fit between the heads and flanges of adjacent rails, each individual joint bar being crowned while positioned against the rails. In this manner no difficulty is encountered in reforming joint bars, due to any difference in the wear of the bars, when the traffic over a section of track is not of the same character or the track is not subjected to the same amount of traffic over the entire section.

Although the advantages of my invention are greatest when the rails are utilized as a die structure, with the heads and flanges thereof serving as cooperating die elements, it is not necessarily limited thereto. In some cases it may be desirable to crown worn joint bars in a suitable die structure or forming apparatus, and not utilize the rails as a die structure. This may be true where it is preferred to initially crown the worn joint bars a certain definite amount, or where it is desired to crown a number of worn bars to the same height. In such cases the joint bars may be secured in any forming apparatus suitable for this purpose, and the slotted bars expanded laterally the desired amount, as previously described, to obtain the proper degree and shape of crowning. Where a number of worn bars are crowned to the same height, it may be preferable to use these bars where a number of rail joints have worn substantially uniformly, and to crown the bars which have not worn uniformly or have worn irregularly, while positioned at the rail joints.

While I have illustrated a rail joint with angle bar forms of rail joint bars, it is apparent that other types of joint bars may be employed. Moreover, modifications of the various methods of my invention, which I have described, will occur to those skilled in the art. I desire it to be understood, therefore, that my invention is not to be limited to the particular arrangements disclosed, and I intend in the appended claims to cover all modifications which do not depart from the spirit and scope of my invention.

I claim:

1. A method of reconditioning a rail joint comprising opposed rail ends and a joint bar connecting the same and having at least one longitudinal slot intermediate its ends, such method including spreading the slot of said bar by the action of wedging surfaces, at least one of the said surfaces having portions laterally tapered, so as to expand a portion thereof laterally to conform at least one fishing surface of the bar to the cooperating fishing surfaces of the rail ends.

2. A method of reconditioning a rail joint comprising opposed rail ends and a joint bar connecting the same and having at least one longitudinal slot intermediate its ends, such method including spreading the slot of said bar, while the same is in a normal position alongside the rail ends, by means of a member having a wedging surface thereof tapered both laterally and longitudinally so as to conform the fishing surfaces of the bar to the cooperating fishing surfaces of the rail ends.

3. A method of reconditioning a rail joint bar which comprises applying a high temperature cutting flame to a joint bar, thereby providing at least one longitudinal slot intermediate the ends of the bar; spreading the slot of the bar, while the same is positioned in a die structure having cooperating die elements, so as to raise a portion of at least one fishing surface of the bar until it contacts the surface of its cooperating die element; and maintaining the bar in its widened condition.

4. A method of reconditioning a rail joint comprising opposed rail ends and a joint bar connecting the same, such method including slotting and reshaping the joint bar while the same is in a normal position alongside the rail ends, the rail ends serving as a die structure for such reshaping operation.

5. A method of reconditioning a rail joint comprising opposed rail ends and a joint bar connecting the same, such method including the step of cutting at least one longitudinal slot in said bar intermediate its ends and lengthwise thereof, and spreading said slot so as to reform the portion of the bar opposite said slot.

6. A method of reforming a rail joint bar which comprises cutting at least one longitudinal slot in the bar intermediate its ends, and spreading said slot, while the bar is positioned in a die structure having cooperating die elements, so as to raise a portion of at least one fishing surface of the bar until it contacts the surface of its cooperating die element.

7. A method of reconditioning a rail joint comprising opposed rail ends and a joint bar connecting the same, such method including cutting at least one slot in a bar intermediate its ends and lengthwise thereof, without removing the same from its normal position alongside the rail ends, and spreading said slot so as to expand a portion of the bar laterally to conform at least one fishing surface of the bar to the cooperating fishing surfaces of the rail ends.

8. A method of reconditioning a worn rail joint consisting of opposed rail ends and a joint bar connecting the same, the upper and lower fishing surfaces of the bar having worn areas spaced from corresponding worn areas in the fishing surfaces of the rail ends, such method including cutting at least one longitudinal slot in the joint bar intermediate its ends, without removing the same from its normal position alongside the rail ends, and spreading said slot so as to expand a portion of said bar laterally to restore contact between said worn areas.

9. A method of reconditioning a rail joint comprising opposed rail ends and a joint bar connecting the same and having a longitudinal slot intermediate its ends, said method including the steps of inserting one or more wedges into the slot from the inner side of such a bar; and securing the bar to the opposed rail ends, with the base or bases of the wedge or wedges abutting the webs of said rail ends, so as to force the wedge or wedges through the slot, the slot and wedge or wedges being of such shape that a portion of at least one fishing surface of the bar will be raised to conform to the cooperating fishing surfaces of the rail ends.

10. A method of crowning a fishing surface of a longitudinally slotted joint bar, which comprises spreading said slot by means of a tapered member so as to expand laterally the portion of said bar opposite said slot, and welding the said member to the joint bar at the slot, thereby maintaining said slot in its widened condition.

11. A method of crowning a fishing surface of a longitudinally slotted joint bar, which comprises spreading said slot so as to raise a portion of said fishing surface, and introducing welding metal in said widened slot.

12. A method of crowning a fishing surface of a bar having a comparatively long and narrow longitudinal opening therein, which includes the step of forcing one or more both laterally and longitudinally tapered wedges into said opening to change the contour of said fishing surface and form a crowned area therein opposite said opening.

13. A method of crowning a fishing surface of a rail joint bar, which comprises slotting said bar longitudinally at a point adjacent a fishing surface to be crowned but remote from the opposite margin of the joint bar, thereby forming a narrow longitudinal slot, spreading said slot by a wedging action so applied as to be principally effective for forming a crowned area in said fishing surface adjacent said slot, and maintaining said slot in its widened condition.

14. A method of crowning a fishing surface of a rail joint bar, which comprises slotting said bar longitudinally intermediate its ends, forcing one or more wedges in said slot, said slot and wedge or wedges being of such shape that an area of said fishing surface will be raised to form a crowned area therein opposite said slot, and fixing said wedge or wedges to said bar.

15. A reconditioned rail joint comprising opposed rail ends and a joint bar connecting the same having a crowned area in at least one fishing surface thereof, and a longitudinal slot in said bar opposite said crowned area, said slot being spread to produce said crowned area and means therein having wedging surfaces, at least one of which is laterally tapered for maintaining the same in a widened condition 16. A reconditioned rail joint comprising opposed rail ends and a joint bar connecting the same having a crowned area in at least one fishing surface thereof, and a narrow longitudinal slot in said bar adjacent but spaced from said crowned area, and one or more wedges in said slot cooperating therewith to produce and maintain said crowned area, at least one of the wedges having at least one of its wedging surfaces tapered laterally from a midpoint therein.

17. A rail joint bar having a fishing surface with a crowned area, a longitudinal slot in said bar opposite said crowned area, and one or more wedges in said slot and cooperating therewith to produce said crowned area at least one of the said wedges having at least one wedging surface tapered laterally from a midpoint in said surface.

18. A method of crowning a fishing surface of a rail joint bar having an elongated opening therein, comprising the step of spreading the opening by force applied at any selected point longitudinally of the said opening, to increase a lateral dimension of the bar.

19. A rail joint bar having a longitudinal slot therein, and a laterally and longitudinally tapered metal member wedged in the slot to increase locally the vertical dimension of said bar.

20. A rail joint bar having therein two narrow longitudinal slots arranged in parallel, the said slots being disposed respectively adjacent the upper and lower fishing surfaces of the said bar, and at least one of the said slots having wedged therein a metal member adapted to increase locally the vertical dimension of the said bar.

21. A method of reconditioning a rail joint, comprising opposed rail ends and a joint bar connecting the same having two parallel longitudinal slots intermediate its ends and disposed adjacent fishing surfaces of the joint bar, the said method comprising independently spreading the respective slots to conform the respective fishing surfaces of the bar to the adjacent cooperating fishing surfaces of the rail ends.

22. A method of crowning the fishing surfaces of a rail joint bar at a rail joint formed of opposing rail ends, the said bar having a narrow longitudinal slot in a midportion, which slot has its greatest width midway of its ends, the said method comprising positioning in the slot a wedge member having opposite wedge surfaces each tapered laterally from a midpoint therein, with the thicker end of the wedge member interposed between the rail ends and the joint bar, and with the opposite end of the wedge member extending outwardly beyond the joint bar, and forcing the joint bar and rail ends together at the joint, thereby forming crowned portions in the respective fishing surfaces adjacent the point of greatest width in the slot.

LEO C. RYAN.